United States Patent
Lee et al.

(10) Patent No.: US 7,092,467 B2
(45) Date of Patent: Aug. 15, 2006

(54) METHOD FOR ESTIMATING SYMBOL TIMING IN FEED-FORWARD MANNER

(75) Inventors: Seung-Joon Lee, Daejeon (KR); Yong-Hoon Cho, Daejeon (KR); Ho-Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 762 days.

(21) Appl. No.: 10/183,466

(22) Filed: Jun. 28, 2002

(65) Prior Publication Data
US 2003/0123580 A1 Jul. 3, 2003

(30) Foreign Application Priority Data
Dec. 28, 2001 (KR) ............... 2001-86513

(51) Int. Cl.
*H04L 7/00* (2006.01)
*H04D 1/00* (2006.01)

(52) U.S. Cl. .................. 375/355

(58) Field of Classification Search .......... 375/142, 375/143, 150, 152, 316, 340, 343, 354, 355, 375/371
See application file for complete search history.

(56) References Cited

U.S. PATENT DOCUMENTS

| | | | |
|---|---|---|---|
| 6,175,600 B1 | 1/2001 | Guillemain et al. | |
| 6,282,248 B1 * | 8/2001 | Farrow et al. | 375/324 |
| 6,839,380 B1 * | 1/2005 | Ding et al. | 375/149 |
| 6,868,129 B1 * | 3/2005 | Li et al. | 375/324 |
| 2002/0131528 A1 * | 9/2002 | Clewer et al. | 375/316 |
| 2003/0107986 A1 * | 6/2003 | Malkemes et al. | 370/208 |
| 2003/0179838 A1 * | 9/2003 | Hamon | 375/326 |

FOREIGN PATENT DOCUMENTS

| | | |
|---|---|---|
| EP | 0355587 | 2/1990 |
| KR | 1998-703715 | 12/1998 |

OTHER PUBLICATIONS

Martin Oerder and Heinrich Meyr; Digital Filter and Square Timing Recovery; IEEE Transactions on Communications, vol. 36, No. 5; May 1988; pp. 605-612.
European Search Report for EP89114740 issued Sep. 24, 1991.
Classen et al.; "An all Feedforward Synchronization Unit for Digital Radio"; 1993 43rd IEEE Vehicular Technology Conference ; May 18, 1993; pp. 738-741.
Sabel et al.; "A Recursive Algorithm For The Estimation Of Symbol Timing In PSK Burst Modems"; Communicaiton For Global Users . . . ; Dec. 6, 1992; pp. 360-364.
Mueller et al.; "Timing Recovery in Digital Synchronous Data Receivers"; IEEE Transactions On Communications; May 1, 1976; pp. 516-531.

* cited by examiner

*Primary Examiner*—Kevin Kim
(74) *Attorney, Agent, or Firm*—Mayer, Brown, Rowe and Maw LLP

(57) ABSTRACT

A receiving system for estimating symbol timing in a feed-forward manner comprises: a matched filter for receiving baseband signals and dividing them into real and imaginary numbers; a symbol timing estimator for receiving signals from the matched filter and estimating symbol timing using variables; a storage unit for storing the variables and outputting them according to requests of the symbol timing estimator; an interpolator for receiving a symbol timing estimate from the symbol timing estimator, and interpolating symbol-reading timing of the baseband signal; a delayer for delaying the baseband signal input to the interpolator; an RF/IF signal processor for receiving RF signals and performing RF/IF signal processing; and a baseband converter for converting the signal output from the RF/IF signal processor into baseband signals, and outputting them to the matched filter.

13 Claims, 2 Drawing Sheets

METHOD FOR ESTIMATING SYMBOL TIMING IN FEED-FORWARD MANNER

CROSS REFERENCE TO RELATED APPLICATION

This application is based on Korea Patent Application No. 2001-86513 filed on Dec. 28, 2001 in the Korean Intellectual Property Office, the content of which is incorporated herein by reference.

BACKGROUND OF THE INVENTION (a) Field of the Invention

The present invention relates to a receiving system for estimating symbol timing in a feed-forward manner and a method for estimating the symbol timing in a feed-forward manner. More specifically, the present invention relates to a receiving system for estimating symbol timing in a feed-forward manner and simply estimating the symbol timing, and a method for estimating the symbol timing in a digital phase modulation communication system.

(b) Description of the Related Art

In general, a receiving system in a communication system receives signals, converts them into baseband signals, performs symbol timing estimation, interpolation, and demodulation in the baseband, and extracts available target signals.

Since symbol intervals of a communication system become very short as high-speed information transmission develops, it is required to accurately control the symbol timing for extracting desired signals so as to extract accurate data, and algorithms for estimating symbol timing are also required.

The algorithms are classified as a feedback configuration and a feed-forward configuration, and the symbol timing estimation algorithm of the feed-forward configuration can operate with two samples per symbol, but the generally-used symbol timing estimation algorithms of the feedback configuration require at least three samples per symbol in most cases, wherein the symbol represents data of a plurality of bits.

However, since it is difficult to use the feedback symbol timing estimation algorithm in the packet transmission communication system, a feed-forward symbol timing estimation algorithm is used, one example of which is disclosed in a thesis entitled "Digital filter and square timing recovery" from IEEE Trans. Communications, Vol. 36, No. 5, Pp. 605–612, of May 1988.

The thesis relates to a symbol timing recovery algorithm suitable for high-speed data transmission, and by applying the algorithm, a free-running oscillator that is not influenced by symbol timing control operation can be used for an analog-digital (A/D) converter.

In general, in the case of using a feedback symbol timing recovery method, sampling time of the A/D converter is controlled by symbol timing errors, and hence a free-running oscillator cannot be used in this case. Using a free-running oscillator for A/D conversion necessitates enabling feed-forward symbol timing recovery. Since a feedback configuration generally requires a long preamble which is used only for signal synchronization but not for user information, it is suitable to use a feed-forward configuration to perform symbol timing recovery in the case of packet transmission.

When the number of required samples per symbol is low, the operation speed of the A/D converter may be slow, and the operation speed of the symbol timing estimation algorithm may also be slow, thereby providing easy implementation.

However, the prior art disclosed in the above thesis requires at least 3 to 4 samples to accurately estimate symbol timing, and accordingly, it problematically generates heavy loads in providing a whole communication service since it has many samples to process for a predetermined time.

That is, the detailed symbol timing estimation algorithm suggested by the prior art thesis is expressed in Equation 1.

$$\hat{\tau} = \frac{1}{2\pi}\arg\left(\sum_{k=0}^{L}|r(kT_s)|^2 e^{-j2\pi\frac{T_s}{T}}\right)$$ Equation 1 where r( ) represents a complex number value of a receiving signal, |x| denotes a magnitude of a complex number x, $T_s$ shows a sampling interval, and T indicates a symbol interval.

If $T_s = \frac{T}{2}, e^{-jk2\pi\frac{T_s}{T}}$ always represents a real number, and hence the estimate of the above equation only is either 0 or ½, thereby failing to execute a normal operation.

Therefore, in order for the equation to normally function, a condition $$\frac{T_s}{T} < \frac{1}{2}$$

must be satisfied, and since a condition $$\frac{T_s}{T} = \frac{1}{4}$$

is generally used, 4 samples are required.

SUMMARY OF THE INVENTION

It is an object of the present invention to provide a receiving system for estimating symbol timing in a feed-forward manner, and a symbol timing estimation method for estimating symbol timing by using two samples for each symbol interval and estimating accurate symbol timing in a feed-forward manner so as to recover received signals in a digital communication system, thereby enhancing whole communication service qualities.

In one aspect of the present invention, a receiving system for receiving radio transmission signals and estimating symbol timing in a feed-forward manner comprises: a matched filter for receiving baseband signals, dividing them into real numbers and imaginary numbers, and outputting them; a symbol timing estimator for receiving signals from the matched filter, estimating symbol timing using various variables, and outputting results; a storage unit for storing values of the various variables needed for the operation of the symbol timing estimator, and outputting them according to requests of the symbol timing estimator; an interpolator for receiving a symbol timing estimate from the symbol timing estimator, and interpolating symbol-reading timing of the baseband signal; a delayer for delaying the baseband signal input to the interpolator as much as the progress degree of signal processing by the symbol timing estimator; an RF (radio frequency)/ IF (intermediate frequency) signal processor for receiving RF signals through an antenna, performing RF and IF signal processing on them, and outputting results; and a baseband converter for converting the signal output from the RF/IF signal processor into baseband signals, and outputting them to the matched filter.

In another aspect of the present invention, a feed-forward symbol timing estimation method of a receiving system for receiving radio transmission signals, converting them into baseband signals, and outputting them comprises: (a) resetting the sample number of symbols needed for symbol timing estimation, output value storage variables, and previous sample signal variables; (b) receiving a sample signal of a real number component of a signal converted into a baseband signal and a sample signal of an imaginary number component of the signal; (c) using the previous sample signal variables and the current sample signals to generate output value storage variables depending on whether the sample number is 0, an even number, or an odd number; (d) controlling to repeat (b) and (c) until the sample number reaches a predetermined value; and (e) using, when the sample number reaches the predetermined value, the corresponding output value storage variables to generate a symbol timing estimate.

The (c) comprises: (1) adding a squared value of the real number value of the current sample signal to a squared value of the imaginary number value of the current sample signal to store the added value in a first temporary storage variable, and adding a product of the real number value of the current sample signal and the real number value of the previous sample signal variable to a product of the imaginary number value of the current sample signal and the imaginary number value of the previous sample signal variable to store the added value in a second temporary storage variable, when the sample number is not 0; (2) subtracting a value of the first temporary storage variable from a real number value of the previous output value storage variable, and subtracting a value of the second temporary storage variable from an imaginary number value of the previous output value storage variable, when the sample number is an odd number; (3) adding a value of the first temporary storage variable to the real number value of the previous output value storage variable, and adding a value of the second temporary storage variable to the imaginary number value of the previous output value storage variable when the sample number is an even number; and (4) storing the variable value of the current sample signal as a variable value of the previous sample signal, and increasing the sample number, when the sample number is 0 after (2) and (3).

In (e), a complex angular value of the output value storage variables is output and is divided by twice the ratio of the circumference of a circle to its diameter to thus output a symbol timing estimate.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
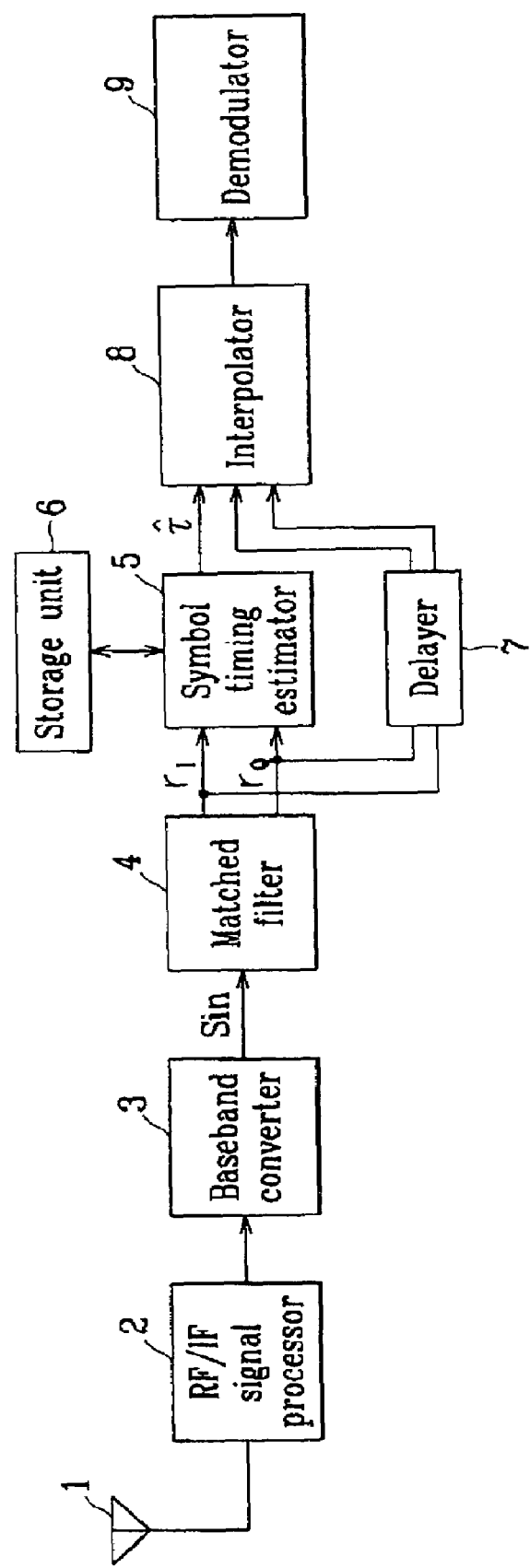
FIG. 1 shows a block diagram of a receiving system for estimating symbol timing in a feed-forward manner according to a preferred embodiment of the present invention.

FIG. 1 shows a block diagram of a receiving system for estimating symbol timing in a feed-forward manner according to a preferred embodiment of the present invention.

As shown, the receiving system comprises: an RF (radio frequency)/IF (intermediate frequency) signal processor 2 for receiving RF signals through an antenna 1, performing RF and IF signal processing on them, and outputting signals; a baseband converter 3 for converting the signals output from the RF/IF signal processor 2 into baseband signals Sin, and outputting them; a matched filter 4 for receiving the baseband signals from the baseband converter 3, dividing them into a real number part and an imaginary number part, and outputting them; a symbol timing estimator 5 for receiving signals $r_I$ and $r_Q$ from the matched filter 4, and using various variables to estimate symbol timing, and outputting it; a storage unit 6 for storing values of the various variables needed for the operation of the symbol timing estimator 5, and outputting them according to requests of the symbol timing estimator 5; a delayer 7 for delaying the baseband signals by the progress degree of signals processed by the symbol timing estimator 5, and outputting them; an interpolator 8 for receiving a symbol timing estimate $\hat{\tau}$ from the symbol timing estimator 5, and interpolating symbol-reading timing of the delayed baseband signal output from the delayer 7; and a demodulator 9 for demodulating the interpolated signal output from the interpolator 8.

An operation of the present invention will now be described.

When receiving a phase-modulated digital signal through the antenna 1, the RF/IF signal processor 2 receives it, performs RF and IF band signal processing on it, and outputs a result.

The baseband converter 3 converts the IF band signal output from the RF/IF signal processor 2 into a baseband signal Sin, and outputs a result.

The matched filter 4 receives the baseband signal Sin from the baseband converter 3, divides it into a real number signal $r_I$ and an imaginary number signal $r_Q$, and outputs them.

The symbol timing estimator 5 receives the signals $r_I$ and $r_Q$ from the matched filter 4, and uses various variables stored in the storage unit 6 to generate a symbol timing estimate $\hat{\tau}$, and outputs it.

The storage unit 6 stores the sample number k of symbols required for estimating the symbol timing; variables $s_I$ and $s_Q$ for storing output values; previous sample signal variables $v_I$ and $v_Q$; and present sample signal variables $r_I$ and $r_Q$.

The delayer 7 delays the baseband signal output from the baseband converter 3 as much as the progress degree of signal processing executed by the symbol timing estimator 6, and outputs a result so as to prevent signal phase differences caused by time delay.

The interpolator 8 receives the symbol timing estimate $\hat{\tau}$ from the symbol timing estimator 5, interpolates the symbol-reading timing of the delayed baseband signal Sin output from the delayer 7, and outputs a result. The demodulator 9 demodulates the interpolated signal output from the interpolator 8.

Accordingly, the phase-modulated and transmitted digital signal is demodulated into the original signal, and is output as an audible signal, and as the frequencies used for communication become higher, it is required to adequately control the symbol detecting timing so as to extract an accurate signal and to minimize the corresponding time so as to control the quality of communication services in real-time.

Figure 2:
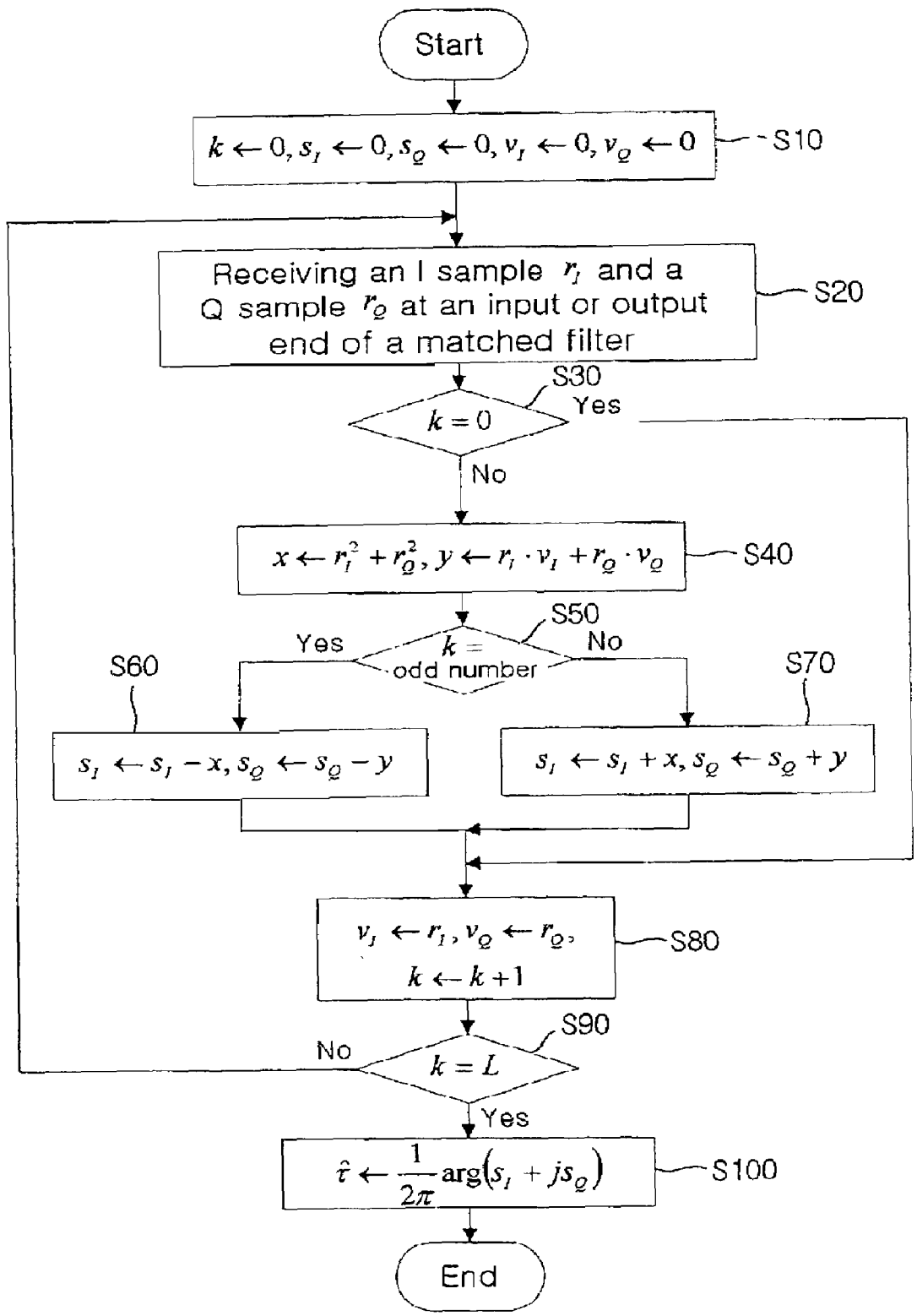
FIG. 2 shows a flowchart of a symbol timing estimation method of the receiving system for estimating symbol timing in a feed-forward manner according to the preferred embodiment of the present invention.

Referring to FIG. 2, a detailed operation of the symbol timing estimator 5 will now be described.

First, the symbol timing estimator 5 resets values of the various variables stored in the storage unit 6, such as the sample number k of the symbols required for symbol timing estimation, variables $s_I$ and $s_Q$ for storing output values, and previous sample signal variables $v_I$ and $v_Q$ in step S10.

The symbol timing estimator 5 receives a sample signal $r_I$ of a real number component and a sample signal $r_Q$ of an imaginary number component of a signal converted into a baseband signal and output from the matched filter 4 in step S20.

It is determined whether the sample number k stored in the storage unit 6 is 0 in step S30.

Since the sample number k is reset to be 0 in the initial stage, the received current sample signal values $r_I$ and $r_Q$ are stored as previous sample signal variables $v_I$ and $v_Q$, and the sample number k is increased by 1 in step S80.

It is determined whether the sample number k reaches a predetermined established value L in step S90, and since the sample number k is less than the established value L, it goes to the previous step S20 of receiving a sample signal $r_I$ of a real number component and a sample signal $r_Q$ of an imaginary number component.

After receiving the sample signal $r_I$ of a real number component and the sample signal $r_Q$ of an imaginary number component, the symbol timing estimator 5 determines whether the sample number k is greater than 0 in step S30.

Since the value of the sample number k is increased, the symbol timing estimator 5 adds the squared value of the real number value of the current sample signal and the squared value of the imaginary number value of the current sample signal, and stores the added value in a first temporary storage variable x as expressed in Equation 2.

$$x \leftarrow r_I^2 + r_Q^2 \qquad \text{Equation 2}$$

In the same manner, the product of the real number value $r_I$ of the current sample signal and the real number value $v_I$ of the previous sample signal variable is added to the product of the imaginary number value $r_Q$ of the current sample signal and the imaginary number value $v_Q$ of the previous sample signal variable, and the added value is stored in a second temporary storage variable y as expressed in Equation 3 in step S40.

$$y \leftarrow r_I \cdot v_I + r_Q \cdot v_Q \qquad \text{Equation 3}$$

Next, the symbol timing estimator 5 determines whether the value of the sample number k is an odd number or an even number in step S50.

Since the value of the sample number k is 1, which is an odd number, the symbol timing estimator 5 subtracts the value of the first temporary storage variable x from the real number value $s_I$ of the previous output value storage variable as expressed in Equation 4, subtracts the value of the second temporary storage variable y from the imaginary number value $s_Q$ of the previous output value storage variable as given in Equation 5, and stores them in step S60.

$$s_I \leftarrow s_I - x \qquad \text{Equation 4}$$

$$s_Q \leftarrow s_Q - y \qquad \text{Equation 5}$$

The symbol timing estimator 5 stores the values $r_I$ and $r_Q$ of the current sample signals as the previous sample signal variables $v_I$ and $v_Q$, and increases the sample number k by 1 in step S80.

The symbol timing estimator 5 determines whether the sample number k reaches the established value L in step S90, and since the sample number k is less than the value L, it goes to the previous step S20.

After performing an operation corresponding to Equations 2 and 3, the symbol timing estimator 5 determines whether the sample number k is an odd number or an even number, and since it is an even number, the symbol timing estimator 5 adds the value of the first temporary storage variable x to the real number value $s_I$ of the previous output value storage variable, and adds the value of the second temporary storage variable y to the imaginary number value $s_Q$ of the previous output value storage variable, as respectively given in Equations 6 and 7.

$$s_I \leftarrow s_I + x \qquad \text{Equation 6}$$

$$s_Q \leftarrow s_Q + y \qquad \text{Equation 7}$$

When the sample number k reaches the value L, the symbol timing estimator 5 outputs a symbol timing estimate using output value storage variables $s_I$ and $s_Q$ at the corresponding time.

That is, as expressed in Equation 8, by outputting a complex angular value of the output value storage variables $s_I$ and $s_Q$ and dividing it by twice the ratio of the circumference of a circle to its diameter, a symbol timing estimate $\hat{\tau}$ is output.

$$\hat{\tau} \leftarrow \frac{1}{2\pi} \cdot \arg(s_1 + js_Q) \qquad \text{Equation 8}$$

The symbol timing estimate $\hat{\tau}$ generated by the symbol timing estimator 5 is used for interpolating signals by the interpolator 6, and accordingly, an accurate original signal can be extracted and demodulated through an adequate interpolation.

Equation 9 shows a detailed algorithm according to the present invention where a condition Ts=T/2 is satisfied.

That is, it represents that symbol timing can be estimated using two samples per symbol.

$$\hat{\tau} = \frac{1}{2\pi}\arg\left\{\sum_{k=0}^{L} |r(kT_s)|^2 e^{-jk\pi} + \text{Re}[r(kT_s)r*((k-1)T_s)]e^{-j(k-0.5)\pi}\right\}$$

Equation 9

According to the present invention, timing of each symbol interval can be estimated with a small number of samples, which requires ⅔ to ½ the load per predetermined time when compared to conventional symbol timing estimation methods.

Therefore, in the case of estimating symbol timing so as to recover received signals in a receiving system of a digital communication system, the present invention reduces the load generated for a predetermined time and accurately estimates symbol timing in a feed-forward manner.

Accordingly, the present invention reduces the load generated for processing the signals received at a whole receiving system to increase the whole communication service quality.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A receiving system for receiving radio transmission signals and estimating symbol timing in a feed-forward manner, comprising:
   a matched filter for receiving baseband signals, dividing the received baseband signals into real numbers and imaginary numbers, and outputting the real numbers and imaginary numbers;
   a symbol timing estimator for receiving the real numbers and imaginary numbers from the matched filter, estimating symbol timing using various variables, and outputting results;
   a storage unit for storing values of the various variables needed for the operation of the symbol timing estimator, and outputting the values of the various variables according to requests of the symbol timing estimator; and
   an interpolator for receiving a symbol timing estimate from the symbol timing estimator, and interpolating symbol-reading timing of the baseband signals.

2. The receiving system of claim 1, further comprising a delayer for delaying the real numbers and imaginary numbers and providing the real numbers and imaginary numbers to the interpolator as much as the progress degree of signal processing by the symbol timing estimator.

3. The receiving system of claim 1, further comprising:
   an RF (radio frequency)/IF (intermediate frequency) signal processor for receiving RF signals through an antenna, performing RE and IF signal processing on the received signals, and outputting results; and
   a baseband converter for converting the results from the RF/IF signal processor into baseband signals, and outputting the baseband signals to the matched filter.

4. The receiving system of claim 1, wherein the storage unit stores a sample number of symbols required for symbol timing estimation and outputs value storage variables, previous sample signal variables, and current sample signal variables.

5. The receiving system of claim 1, further comprising a demodulator for demodulating the interpolated signal output from the interpolator.

6. A feed-forward symbol timing estimation method of a receiving system for converting received radio transmission signals into baseband signals, the method comprising:
   (a) receiving a sample signal of a real number component of a signal converted into a baseband signal and a sample signal of an imaginary number component of the signal converted into the baseband signal;
   (a) receiving a sample signal of a real number component of a signal converted into a baseband signal and a sample signal of an imaginary number component of the signal converted into the baseband signal;
   (b) generating output value storage variables using previous sample signal variables and current sample signals, depending on a sample number;
   (c) increasing the sample number by one;
   (d) repeating the steps (b) and (c) until the sample number reaches a predetermined value; and
   (e) when the sample number reaches the predetermined value, generating a symbol timing estimate using the corresponding output value storage variables, wherein the symbol timing is estimated using two samples per symbol.

7. The method of claim 6, wherein the step (b) comprises:
   (1) adding a squared value of a real number component of current sample signals to a squared value of an imaginary number component of the current sample signals to provide a first added value and store the first added value in a first temporary storage variable, and adding a product of the real number component of the current sample signals and a real number component of previous sample signal variables to a product of the imaginary number component of the current sample signals and an imaginary number component of the previous sample signal variables to produce a second added value and store the second added value in a second temporary storage variable, when the sample number is not 0;
   (2) subtracting the first added value of the first temporary storage variable from a real number value of a previous output value storage variable, and subtracting the second added value of the second temporary storage variable from an imaginary number value of the previous output value storage variable, when the sample number is an odd number; and
   (3) adding the first added value of the first temporary storage variable to the real number value of the previous output value storage variable, and adding the second added value of the second temporary storage variable to the imaginary number value of the previous output value storage variable, when the sample number is an even number.

8. The method of claim 6, wherein in the step (e), a complex angular value of the output value storage variables is output and is divided by twice the ratio of the circumference of a circle to the diameter of the circle to thus output a symbol timing estimate.

9. A method of estimating symbol timing in a symbol timing estimator, comprising:
- a) resetting a sample number and variables for storing output values;
- b) receiving sample signals outputted from a matched filter;
- c) modifying the variables for storing output values using the sample signals and the variables for storing output values, depending on the sample number;
- d) increasing the sample number and repeating the step c) until the sample number reaches a predetermined value; and
- e) generating a symbol estimate using the modified variables for storing output values, wherein the symbol timing is estimated using two samples per symbol.

10. The method of claim 9, wherein the step (c) comprises adding a squared value of a real number component of current sample signals to a squared value of an imaginary number component of current sample signals to provide a first added value and store the first added value in a first temporary storage variable, and adding a product of the real number component of the current sample signals and the real number component of previous sample signal variables to a product of the imaginary number component of the current sample signals and an imaginary number component of the previous sample signal variables to produce a second added value and store the second added value in a second temporary storage variable, when the sample number is not 0.

11. The method of claim 10, further comprising subtracting the first added value of the first temporary storage variable from a real number value of a previous output value storage variable, and subtracting the second added value of the second temporary storage variable from an imaginary number value of the previous output value storage variable, when the sample number is an odd number.

12. The method of claim 10, further comprising adding the first added value of the first temporary storage variable to a real number value of the previous output value storage variable, and adding the second added value of the second temporary storage variable to an imaginary number value of the previous output value storage variable, when the sample number is an even number.

13. The method of claim 9, wherein in the step (e), a complex angular value of the output value storage variables is output and is divided by twice the ratio of the circumference of a circle to the diameter of the circle to thus output a symbol timing estimate.

* * * * *